(No Model.)
W. W. CARMAN.
STEAM HEATING RADIATOR.
No. 348,615. Patented Sept. 7, 1886.
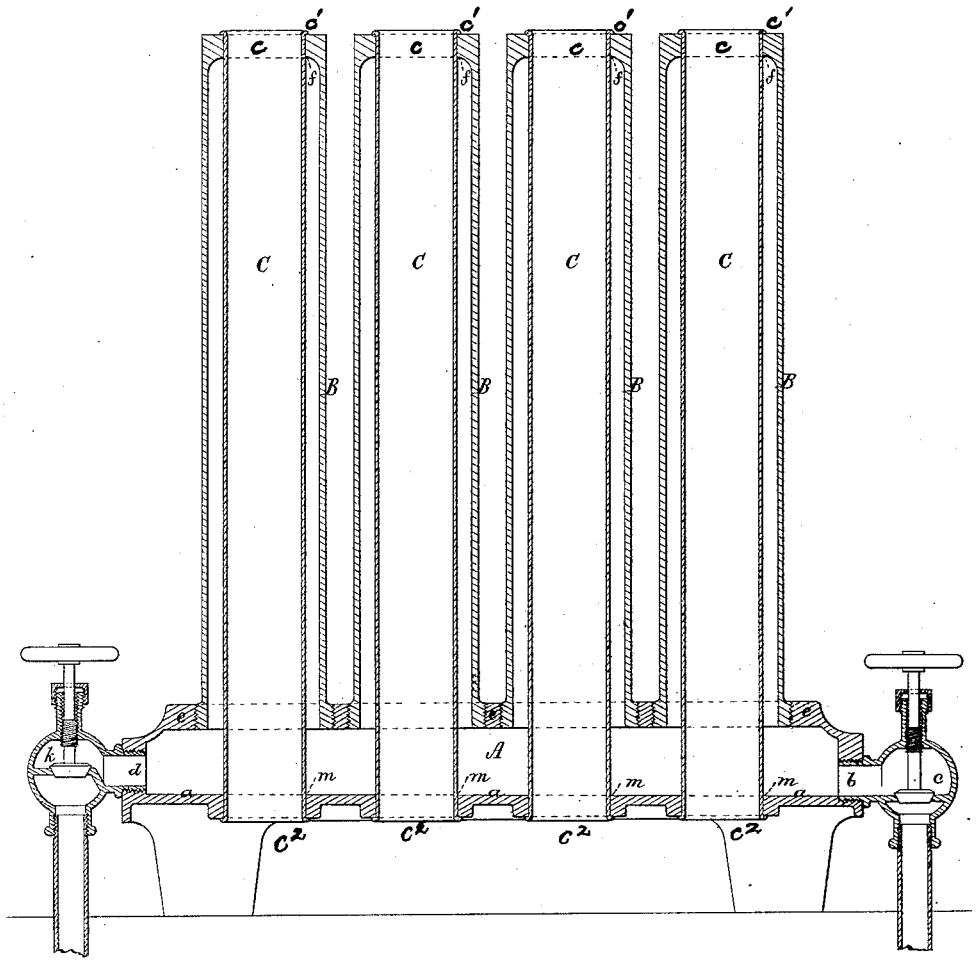
Witnesses
S. N. Piper
R. B. Torrey
Inventor
Wm. W. Carman
by R. H. Eddy atty

UNITED STATES PATENT OFFICE.

WILLIAM WALLACE CARMAN, OF PORTSMOUTH, NEW HAMPSHIRE.

STEAM-HEATING RADIATOR.

SPECIFICATION forming part of Letters Patent No. 348,615, dated September 7, 1886.

Application filed October 14, 1885. Serial No. 179,841. (No model.)

*To all whom it may concern:*

Be it known that I, WILLIAM WALLACE CARMAN, of Portsmouth, in the county of Rockingham, of the State of New Hampshire, have invented a new and useful Improvement in Steam-Heating Radiators for Warming Buildings or the Apartments thereof; and I do hereby declare the same to be described in the following specification and represented in the accompanying drawing, which is a vertical section of a radiator containing my invention, the nature of which is defined in the claim hereinafter presented, and which invention is an improvement upon United States Patent No. 316,522 in the particular hereinafter set forth.

In the drawing, A denotes a hollow or chambered base having an inclined bottom, $a$, leading to an educt, $b$, provided with a stop-cock, $c$. An induct for steam to enter the base is shown at $d$, it being provided with a stop-cock, $k$. Extending upward from the tap $e$ of the base is a series of pipes, B, each of which at its lower end is screwed into such tap and at its upper end is closed, excepting in having in such end a hole or aperture, $f$, to receive the upper end of a pipe, C. Within each pipe B and concentric therewith is a pipe, C, having a diameter somewhat less than that of the bore of the pipe B, but equal to that of the hole $f$. Each pipe C extends through the inclined bottom of the base A, there being through such bottom an aperture, $m$, having a diameter equal to that of the lower part of the pipe. The pipe C extends a little below the said bottom and also a little above the top of the pipe B, and both at top and bottom is expanded and upset, as pipes are usually upon the head of a tubular boiler of a locomotive-engine, from which it will be seen that in case of a tight joint not being made at either end of the pipe C it can be made so by screwing back or unscrewing a little the surrounding pipe B.

In the above-described radiator steam, after having entered the base, circulates between each pipe C and its surrounding pipe B, and by heating both causes air about the pipe B, as well as that passing up through the pipe C, to be heated.

This device is an improvement over a former invention of mine contained in the patent referred to in that the upper ends, $c$, of the pipes C being turned over at $c'$ form such a joint that by unscrewing the pipes B this joint can be closed tightly when the pipes are heated, and when cooling the inner pipes, C, contracting more necessarily precludes any opening of said joints, and the lower ends, $c^2$, catching under the base A this action is bound to take place.

Having described my invention, what I claim is—

The combination of the hollow base A, the pipes B, screwed into said base, and the pipes C, passing through said base and the pipes B, as described, the said pipes C having at their upper ends the turned-over ends $c$ at $c'$, whereby said pipes B can be adjusted on the pipes C so as to insure a steam-tight joint, as set forth.

WILLIAM WALLACE CARMAN.

Witnesses:
EDWARD P. CARMAN,
CHARLES E. BATCHELDER.